2,752,294

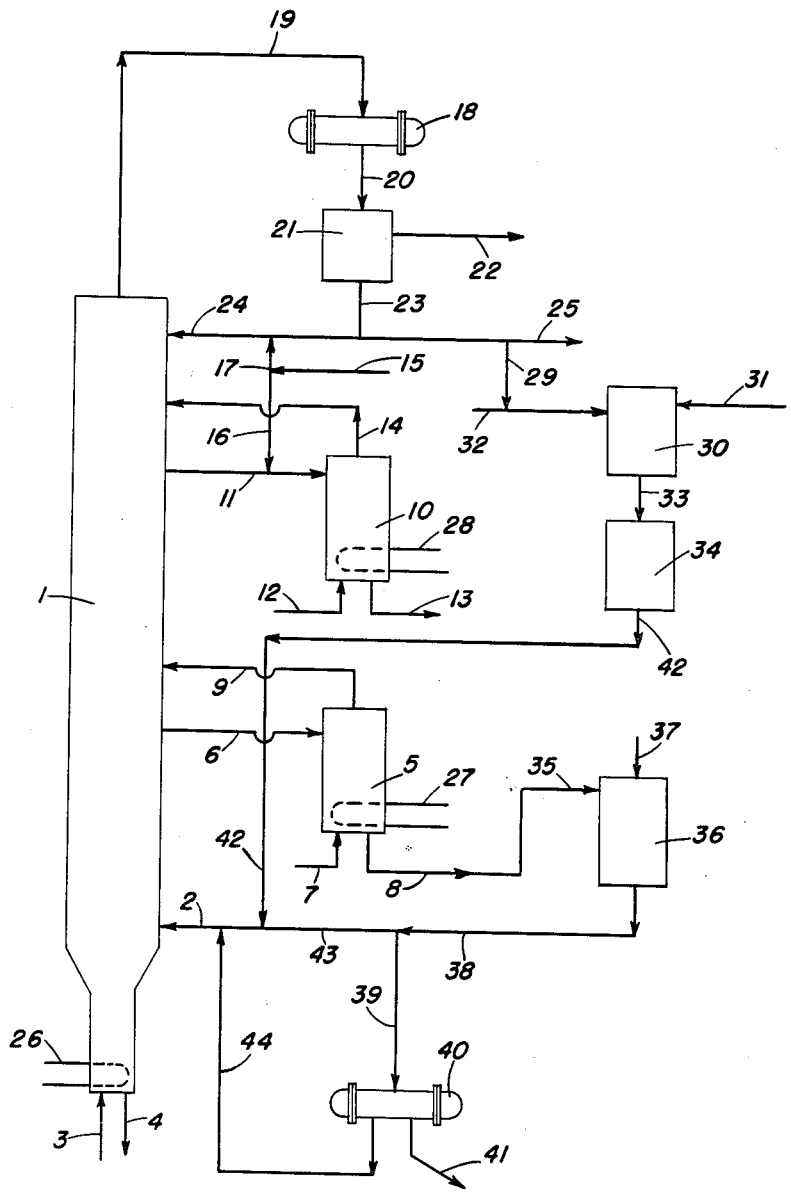

FRACTIONAL DISTILLATION OF DECOMPOSITION PRODUCTS OF DIARYLALKANES

Leon Lazare, Westbury, N. Y., assignor to American Cyanamid Company, New York, N. Y., a corporation of Maine Application December 7, 1955, Serial No. 551,667

5 Claims. (Cl. 202—40)

This invention relates to the separation of the various components of mixtures obtained from two or more reaction steps of a process involving the synthesis and subsequent decomposition of diarylalkanes having at least two carbon atoms in the alkane chain and having aryl substituents attached to one of said carbon atoms. More particularly this invention relates to the separation by fractional distillation of a mixture of an unsymmetrical diarylalkane, a vinyl-substituted aryl compound, an alkyl-substituted aryl compound, and tar.

Mixtures of organic compounds obtained by the synthesis and subsequent catalytic decomposition of an alkane having at least two carbon atoms and having two aryl substituents attached to one of said carbon atoms contain such compounds as undecomposed paraffin, vinyl-substituted aryl compounds, alkyl-substituted aryl-compounds, and tarry residue. The separation of the mixture is carried out by a fractional distillation in the presence of steam used as a diluent. In U. S. patent application Serial No. 452,413, filed on August 26, 1954, and now pending, the process for separation of a mixture obtained by the partial catalytic decomposition of an unsymmetrical diarylalkane into its several components by a single passage through a fractional distillation column is disclosed.

I have now found that it is possible to effect a good separation of components, even when the mixture obtained from the synthesis reaction of the diarylalkane is combined with the decomposition reaction product and the combined mixture is subjected to fractional distillation. The process of the instant invention provides various advantages, notably, the substantial economy in equipment and operating expense in that the steam contained in the cracking reaction mixture is employed to heat the synthesis reaction mixture to the volatilization temperature necessary to effect fractional distillation of the various components. In the separation process of the instant invention the steam not only acts as a diluent for the mixture during the fractional distillation thereof but also acts as a source of heat to volatilize the volatile organic mixture in the process of separation. Inasmuch as certain materials contained in the mixture are heat-sensitive, the presence of steam acts to reduce the partial pressure of the compounds, particularly the heat polymerizable components in the system, thereby advantageously lowering the boiling point of such components in the system. By the process of my invention, an effective separation of the components is realized. The undecomposed diarylalkane recovered may again be subjected to a partial catalytic decomposition by a simple recycling of said diarylalkane to a cracking zone. The vinyl-substituted aryl compounds find particular employment in the production of polymers which in turn are useful for molding, casting, laminating, and other purposes. The alkyl-substituted aryl compounds obtained by the separation of the mixture are reacted for the formation of additional diarylalkane compounds.

It is therefore an object of my invention to separate by fractional distillation the combined mixture obtained by the synthesis and subsequent catalytic decomposition of a paraffin having at least two carbon atoms and having two aryl substituents attached to one of said carbon atoms. It is a further object of my invention to separate a mixture containing a 1,1-diarylalkane, a vinyl-substituted aryl compound, an alkyl-substituted aryl compound, and tar. These and other objects of my invention will be discussed more fully hereinbelow.

Diarylalkanes having at least two carbon atoms and having two aryl substituents attached to one of said carbon atoms are such as each of the 1,1-ditolylethanes, each of the 1,1-dixylylethanes, each of the 1,1-ditolylpropanes, each of the 2,3-ditolylpropanes, each of the 1,1-di-(monochlorophenyl)-ethanes, each of the 1,1-di-(dichlorophenyl)-ethanes, each of the 1,1-di-(dimethylaminophenyl)-ethanes, each of the 1,1-dinaphthylethanes, each of the 1,1-dixenylethanes, and the like, and their nuclear-substituted halogen, amino, and other derivatives. These substances containing tolyl, xylyl, xenyl, monochlorophenyl, and dichlorophenyl groups may be attached to the carbon atom of the paraffin chain at the ortho, meta, or para positions, and when two of these groups are present, they may be attached in the same or different positions. These compounds may be prepared, for example, by the reaction of acetylene or substituted acetylene and a mono- or di-alkyl-substituted benzene in the presence of a suitable catalyst. Such compounds when catalytically decomposed yield ring- or nuclear-substituted styrenes which are useful in the production of thermoplastic polymeric materials. Another method that may be employed in the production of diarylalkanes is such as the condensing of an aryl compound with a saturated aliphatic organic compound having a carbonyl group and at least two carbon atoms, e. g., aldehydes and ketones, in the presence of a suitable catalyst, such as hydrogen fluoride.

The catalytic conversion of these paraffins having at least two carbon atoms and having two aryl substituents attached to one of said carbon atoms is well known. The Dixon U. S. Patents Nos. 2,422,163, 2,422,164, and 2,422,165 disclose various catalysts that may be employed for such decomposition. Upon partial decomposition of the substituted paraffins, a plurality of organic compounds is obtained. The mixture contains undecomposed substituted paraffin, vinyl-substituted aryl compounds and alkyl-substituted compounds. When a 1,1-diarylalkane, such as 1,1-ditolylethane is synthesized from acetylene and toluene and is then partially catalytically converted, the resulting mixtures contain 1,1-ditolylethane, methylstyrene, a small percentage of ethyl-tolene, toluene, and tarry material. The acetylene, because of its high activity, is fully consumed. In the event that a 1,1-dixylylethane is snythesized and converted, the resulting mixture contains undecomposed 1,1-dixylylethane, dimethylstyrene, a small amount of ethylxylene, xylene, and tarry material. By the process of my invention, a separation of the plurality of organic compounds contained in the mixtures is effected.

The partial catalytic decomposition of the substituted paraffins may be carried out at temperatures varying from about 350° C. up to about 600° C., or even higher in some cases, in the presence of a suitable decomposition catalyst. Inasmuch as temperatures above about 540° C. start to cause some pyrolysis loss, it is important to employ a short time of contact of the substituted paraffins with the catalyst when temperatures in the neighborhood of 540° C. are used. Any material which is volatile, which does not react with the diaryl-substituted paraffin, and which does not react with the products formed by the decomposition of said paraffin may be used as a diluent during the partial catalytic decomposition. Among these, some examples are: water, the hydrocarbons, such as benzene and toluene, the fixed gases, such as nitrogen and carbon dioxide, and the like. Water vapor is the preferred diluent, inasmuch as it may be readily condensed and therefore separated from the products of the reaction, whereas the fixed gases or the hydrocarbons are somewhat more difficult to separate. The molar ratio of diluent to the diaryl-substituted aliphatic compound in the feed to the catalyst during decomposition is preferably between about 5:1 and 50:1, or more. As previously stated, steam or water vapor is the preferred diluent.

The process of the invention is suitable for separation of components involving more than one reaction step, such as the synthesis reaction (1)  $aA+BbA+C+D$ and the conversion reaction (2)  $cCdA+eC+E+F$ wherein "A" and "B" are the reactants employed in synthesizing the diarylalkane "C." "E" represents the polymerizable component and "D" and "F" the tarry materials of Reactions 1 and 2, respectively. The letters "$a$," "$b$," "$c$," "$d$," and "$e$" designate quantitative amounts. Ordinarily a complicated system of distillation operations involving many distillation columns is required to separate the products from Reactions 1 and 2. Distillation columns are required to separate material "A" from "C" and "D," and to separate "C" from "D" for the Reaction 1. Distillation columns are also required to separate material "A" from "C," "E," and "F," and to separate "C," "E," and "F" separately. Pure "E" is the final product.

In this invention a single combination column is employed to distill the combined reactor products from (1) and (2).

The mixture obtained by the catalytic conversion or decomposition of the diarylalkane will contain a large amount of steam when steam is used as the diluent during the cracking operation. The mixture will also be of a relatively high temperature in view of the temperature employed during the cracking operation. If desired, the mixture may be introduced directly into a fractional distillation column together with the synthesis reaction mixture for separation, but inasmuch as certain critical operating conditions must be maintained during the separation of the material, it is desired that a portion of the product obtained by the partial catalytic decomposition of the diarylalkane be condensed prior to its introduction into the column in order to remove excess steam. Thus, only so much of the large amounts of available steam from the conversion reaction as is necessary to vaporize the combined material derived from both the synthesis and decomposition reactions of diarylalkanes is employed. Steam is preferably employed for the catalytic conversion of the diarylalkane and to supply heat to the volatile organic compounds for the volatilization thereof, but other methods may also be employed, if desired, for example, a reboiler may also be employed in the column. Also, fixed inert gases, as well as fuel gas, may be used as a source of heat. However, in view of that fact that condensation of the volatile material taken from the top of the column is more difficult in the presence of an inert gas, it is preferred that the heat employed in the system be derived from steam. The temperature and the amount of steam employed during the distillation are such that no condensation of steam occurs in the column. This amount and temperature of the steam may be readily determined by those skilled in the art. It is necessary that the vapor pressure of the steam exceed the partial pressure of the steam in the vapor phase in order to avoid condensation in the column. Therefore, in the uppermost portion of the column, there will be more vaporous aryl compound, i. e., components of the mixture having no vinyl or polymerizable substituent attached to the benzene ring, such as toluene, xylene, and the like, than steam. This weight ratio of aryl compound to steam may be adusted by employing a lesser amount of steam during the distillation or an alternative method may be by refluxing a greater amount of the aryl compound. In any event, the amount of reflux is always such as to prevent any condensation taking place in the column.

The mixture containing synthesis and decomposition reaction products, i. e., undecomposed diarylalkane, vinyl-substituted aryl compounds, aralkyl compounds devoid of nonbenzenoid unsaturation, tarry material, and the desired quantity of steam, obtained by the partial catalytic decomposition of the diaryl-substituted paraffin, is introduced near the bottom of a fractional distillation column. In the event that an excessive portion of the steam has been condensed from the cracker product prior to the introduction of the product into the column, it may be desirable to supply additional steam to the bottom of the column in order to insure complete volatilization of the organic compounds in the column, although because of the large amounts available steam from the conversion reaction, this should not be necessary. The volatile materials are then passed upwardly through the zones of the column. The tarry products are removed from the bottom of the column. The undecomposed diarylalkane is withdrawn as a first overhead fraction as liquid from the distillation mixture. This undecomposed diarylalkane is removed from a lower zone of the column, above which the tarry products have not passed. The column employed for the fractional distillation of the mixture contains a plurality of plates, as is well known, and the column may be divided generally into four zones. In the first or bottom zone the tarry product from which the more volatile undecomposed diarylalkane has been stripped is withdrawn as bottom product. This first zone may be dispensed with if the amount of undecomposed diarylalkane in the tarry product entering this zone is negligible; the unstripped tarry product may then be withdrawn directly from the bottom of the column now deprived of this tarry product stripping zone. Furthermore, if the amount of the unstripped tarry product stream is excessively large, this bottom zone may be physically separate from the remainder of the column, in which case the unstripped tarry product issuing from the main column is introduced into the top of a physically separate zone and the vaporous volatile materials are returned together with the vaporous stripping medium to the bottom of the main column. In the second zone the undecomposed diarylalkane, as liquid, is withdrawn as a first overhead fraction. No tarry products pass this zone. The third zone of the column is employed to remove the vinyl-substituted aryl compound, as liquid, as a second overhead fraction. No undecomposed diarylalkane passes through this zone. In the event that cracker product contains some saturated vinyl-substituted aryl compounds, it is withdrawn as a liquid with the said vinyl-substituted compound. The fourth zone of the column is the uppermost portion of the column and all of the steam present, together with the aralkyl compound devoid of non-benzenoid unsaturation is removed from the top of the column. The term aralkyl compound devoid of non-benzenoid unsaturation excludes compounds having an unsaturated or vinyl group on the benzene ring. It is in the uppermost zone that the ratio of the said aralkyl compound and the steam must be critically controled in order to prevent any condensation of the steam in the column. The vapors removed from the top of the column are condensed in a conventional condenser, the water separated therefrom and a portion of the aralkyl compound then reintroduced into the top of the column as reflux.

The temperature at the top of the first zone of the column is preferably in the order of from about 200° C. to about 210° C. The undecomposed diarylalkane, as liquid withdrawn from the first zone of the column, is then treated in a side stripping column, preferably with steam, in order to remove any compounds having a boiling point lower than the said diarylalkane. The volatile materials removed from the diarylalkane are then reintroduced into the column at the point or slightly above the point of original takeoff and the undecomposed diarylalkane is withdrawn from the bottom of the side stripping column. The product recovered from the side stripping column is substantially pure and the temperature maintained in the side stripper is preferably in the order of from about 185° C. to about 200° C.

After the undecomposed diarylalkane has been removed from the mixture, distillation is continued in the column and the vinyl-substituted aryl compound, as liquid, is next removed as an overhead fraction in an intermediate zone of the column. The liquid removed is treated in a side stripping column, preferably with steam, to remove any volatile material having a boiling point lower than the said vinyl-substituted compound which is then reintroduced into the column at the point or slightly above the point of original takeoff. Inasmuch as heat polymerization of the vinyl-substituted compound may occur in the stripping column, it is desirable to introduce a polymerization inhibitor into the stripping column. Inhibitors of polymerization, as are well known, are such as elemental sulfur, hydroquinone, tertiary-butyl catechol, di-(tertiary butyl)-hydroquinone, trinitrobenzene, and the like. Sulfur is the preferred polymerization inhibitor. The temperature maintained in the side stripping column should be less than 115° C., preferably from about 100° C. to about 115° C., in order to avoid any heat polymerization of the vinyl-substituted compound in the column.

The remaining alkyl-substituted aryl compound and all of the steam are then removed from the uppermost zone of the column. The temperature in the upper portion of the column is preferably in the order of about 85° C. No vinyl-substituted aryl compound is allowed to pass out of the uppermost zone of the column. Therefore, the only components passing out of the upper portion of the column will be steam and the aralkyl compound devoid of non-benzenoid unsaturation.

The vinyl-substituted aryl compound recovered from the mixture may be treated by a subsequent distillation, as is well know in the art, to recover the compound from any saturated vinyl-substituted aryl compound present, as well as to recover the pure compound from the polymerization inhibitor introduced therein during the side stripping operation.

The present invention is particularly suitable for the separation of a mixture containing the synthesis and decomposition reaction products of unsymmetrical diarylalkanes. Because of the polymerizable nature of a component of the mixture, a separation of such compounds in the manner of the instant invention was not heretofore considered practicable. The successful utilization of the present process for separating the several components of the mixture is believed possible due to the following factors, among others: (1) the similarity of the components in the synthesis and decomposition reaction which permits a combining of the two mixtures; (2) the substantial differences in boiling points of these components; and (3) the fact that these mixtures, one of which requires heat vaporization and the other of which has excess heat available, may readily be mixed, exchange heat, and be treated as a single mixture. The process is useful in the separation of the synthesis and decomposition reaction product mixtures of various diarylalkanes, such as a mixture containing 1,1-ditolylethane, methylstyrene, and toluene obtained by the partial catalytic decomposition of 1,1-ditolylethane; a mixture containing 1,1-dixylylethane, dimethylstyrene, and xylene obtained by the partial catalytic decomposition of 1,1-dixylylethane, and the like. It is understood that the separation of mixtures obtained by the synthesis and decomposition reactions of other diarylalkanes may also be carried out by the process of the invention.

My invention will be further illustrated by the simplified flow plan of the accompanying drawing. The process, with reference to the drawing, will be described in connection with the synthesis of 1,1-ditolylethane from acetylene and toluene and the subsequent partial decomposition thereof into a reaction product containing as main constituents unconverted 1,1-ditolylethane, methylstyrene, and toluene, but it will be understood that the procedure is applicable to other unsymmetrical diarylalkanes as well. In the drawing the fractional distillation column 1 is charged with the reaction products obtained by the synthesis and catalytic decomposition of 1,1-ditolylethane. The mixture containing 1,1-ditolylethane, methylstyrene, toluene, tarry residues, trace amounts of ethyltoluene and steam is introduced into the column through line 2. The mixture entering at line 2 is a composite mixture of the products of the 1,1-ditolylethane synthesis reaction and the cracking or decomposition reaction of this compound. The 1,1-ditolylethane is synthesized in a conventional manner in a reactor as shown at 30 by charging acetylene 31 and toluene 32 therein. The synthesis reaction product containing a mixture of 1,1-ditolylethane, toluene, and tarry residue enters a conventional separating apparatus 34 through line 33. The 1,1-ditolylethane is withdrawn as a side stream from the main column 1 through the line 6, the side stripping column 5, line 8 and charged through the line 35 into the catalytic cracking converter 36. Necessary for this reaction is steam which is introduced at 37. The decomposition reaction products leave the catalytic converter through line 38. A portion of this stream which contains excessive steam not necessary for the further vaporization of the total mixture in the main column is drawn through line 39 into the condenser 40, where the steam and the organic accompanying it is condensed and waste heat is disposed of, as shown at 41. The synthesis reaction products which contain 1,1-ditolylethane, toluene, and tarry residue, passes through the line 42, where it merges with the hot steam and organics direct from the catalytic converter passing through the line 43. This mixture is further merged with the condensed portion of the cracking converter reaction product, as shown in line 44. The streams 43 and 44 are mixtures containing similar organic components, i. e., undecomposed 1,1-ditolylethane, methylstyrene, toluene, and tarry residue. The heat necessary for vaporization in the main column 1 of the combined mixtures which comprises 3 streams:

1. The synthesis reaction products passing through line 42;

2. The non-condensed portion of the catalytic reaction products passing through line 43; and 3. The condensed portion of the catalytic products passing through line 44 is derived from the non-condensed portion passing directly from the catalytic converter 36 through line 43 and merging with the streams from lines 42 and 44. It is thus seen that the excess steam, which would tend to cause condensation in the column, is condensed prior to the introduction of the material into the column. Varying proportions of the cracking converter product may be treated through line 39 to condense the excess steam present, i. e., steam not desirable for vaporization of the whole mixture in the main column. Additional steam necessary in order to completely strip the volatile cracker product from tarry residue may be introduced into the bottom of the column 1 through line 3. Tarry residues may be removed from the column through line 4. In the fractional distillation column 1 the 1,1-ditolylethane, as liquid, is withdrawn through line 6 into the side stripping column 5. Takeoff line 6 is so located that only trace quantities of tarry products pass the zone from which the 1,1-ditolylethane, as liquid, is removed. Steam may be introduced into the side stream stripper 5 through line 7 in order to remove any material having a boiling point lower than the 1,1-ditolylethane. The 1,1-ditolylethane is withdrawn through line 8 and comprises the charge of 1,1-ditolylethane entering the catalytic converter 36 through line 35. The volatile materials and the steam in the side stripping column are then reintroduced into the column 1 through line 9 into the zone of the column of original withdrawal of the liquid 1,1-ditolylethane.

The distillation in the column 1 continues and the methylstyrene, as liquid, is withdrawn through line 11 into the side stripping column 10. The zone of withdrawal of the methylstyrene is so located in the column 1 that only trace quantities of 1,1-ditolylethane are present. Steam may be introduced into the side stripping column 10 through line 12 in order to remove any materials having a boiling point lower than that of the methylstyrene which is withdrawn through line 13. The vaporous material is then reintroduced into the main column 1 at the zone of original withdrawal through line 14. Inasmuch as the methylstyrene has a tendency to polymerize, an inhibitor such as sulfur may be introduced into the liquid methylstyrene line 11 through lines 15 and 16. Any inhibitor introduced into the side stream stripper 10 will be removed with the product through line 13. Also, any ethyltoluene present in the system will be removed with the methylstyrene. By a subsequent separation, the methylstyrene may be recovered from the ethyltoluene and the inhibitor.

All of the vaporous organic material and all of the steam present are then withdrawn from the uppermost zone of the column 1 through line 19 to the condenser 18. The point of withdrawal of the vaporous toluene and the steam is such that only trace quantities of methylstyrene are present. After the vaporous toluene and steam have been condensed in condenser 18, the liquid is introduced into the decanter 21 through line 20. The water is separated from the toluene and withdrawn through line 22 and the toluene is withdrawn from the decanter through line 23. A certain portion of the liquid toluene is then reintroduced as reflux into the uppermost zone of the column 1 through line 24. As previously indicated, the amount of toluene reintroduced into the main fractionating column as reflux is such that the ratio of toluene to steam in the upper portion of the column allows no condensation of steam in column. The liquid toluene not refluxed to the main fractionating column is withdrawn through line 25 to storage or charged through the line 29 together with the aforementioned toluene charge 32 into the reactor 30. If desired, a small amount of the polymerization inhibitor may be introduced into reflux line 24 through line 17.

Conventional valves, temperature controls, flow regulators, and the like may be employed throughout the equipment for critical control of the separation carried out. Indirectly heated reboiler systems 26, 27, and 28 may be employed in the system if desired. This will permit the use of a higher reflux ratio in the column. The distillation may be carried out under any desired pressure, as for example, superatmospheric, atmospheric, or subatmospheric.

This application is a continuation-in-part of my copending application, Serial No. 452,413, filed August 25, 1954.

It will be apparent that various modifications are possible within the scope of the instant invention, and any enumeration of specific details is not intended to limit the invention, except as defined in the appended claims.

I claim:

1. In a process for separating the components of a combined mixture comprising (a) the synthesis reaction products and (b) the catalytic decomposition reaction products of 1,1-diarylethane, said mixture containing as major constituents undecomposed diarylethane, a compound selected from the group consisting of mono- and di-alkyl nuclear-substituted styrene and a compound selected from the group consisting of mono- and di-alkyl-substituted benzene, the steps which comprise combining (a) and (b), deriving sufficient heat and steam from the reaction products of (b) to vaporize and act as diluent for said combined mixture and separating the mixture in a fractional distillation column by passing the vaporized mixture upwardly through the zones of said column; withdrawing the diarylethane as liquid from a lower zone, treating said liquid to volatilize material having a lower boiling point, recovering the diarylethane and returning said volatile material into the distillation column at substantially the point of original withdrawal, continuing the distillation, introducing a polymerization inhibitor into the liquid, and withdrawing said styrene compound as liquid from an intermediate zone of said column, treating said liquid to volatilize material having a lower boiling point, recovering said styrene compound and returning said volatile material into the distillation column at substantially the point of original withdrawal, withdrawing from the uppermost of said zones all of the steam present together with the vaporous aforementioned substituted benzene, condensing the material from the uppermost zone, separating said substituted benzene compound as liquid from the condensate, and returning a portion of this liquid substituted benzene to the uppermost of said zones as reflux, in sufficient amounts to avoid condensation of steam in said column.

2. In a process for separating the components of a combined mixture comprising (a) the synthesis reaction products and (b) the catalytic decomposition reaction products of 1,1-ditolylethane, said mixture containing as major constituents undecomposed 1,1-ditolylethane, methylstyrene, and toluene, the steps which comprise combining (a) and (b), deriving sufficient heat and steam from the reaction products of (b) to vaporize and act as diluent for said combined mixture and separating the mixture in a fractional distillation column by passing the vaporized mixture upwardly through the zones of said column; withdrawing the undecomposed ditolylethane as liquid from a lower zone, treating said liquid to volatilize material having a lower boiling point, recovering the ditolylethane and returning said volatile material into the distillation column at substantially the point of original withdrawal, continuing the distillation, introducing a polymerization inhibitor into the liquid, and withdrawing the methylstyrene as liquid from an intermediate zone of said column, treating said liquid to volatilize material having a lower boiling point, recovering the methylstyrene and returning said volatile material into the distillation column at substantially the point of original withdrawal, withdrawing from the uppermost of said zones all of the steam present together with the vaporous toluene, condensing the material from the uppermost zone, separating the toluene as liquid from the condensate, and returning a portion of this liquid toluene to the uppermost of said zones as reflux, in sufficient amounts to avoid condensation of steam in said column.

3. In a process for separating the components of a combined mixture comprising (a) the synthesis reaction products and (b) the catalytic decomposition reaction products of 1,1-dixylylethane, said mixture containing as major constituents undecomposed 1,1-dixylylethane, dimethylstyrene, and xylene, the steps which comprise combining (a) and (b), deriving sufficient heat and steam from the reaction products of (b) to vaporize and act as diluent for said combined mixture and separating the mixture in a fractional distillation column by passing the vaporized mixture upwardly through the zones of said column; withdrawing the undecomposed 1,1-dixylylethane as liquid from a lower zone, treating said liquid to volatilize material having a lower boiling point, recovering the 1,1-dixylylethane and returning said volatile material into the distillation column at substantially the point of original withdrawal, continuing the distillation, introducing a polymerization inhibitor into the liquid, and withdrawing the dimethylstyrene as liquid from an intermediate zone of said column, treating said liquid to volatilize material having a lower boiling point, recovering the dimethylstyrene and returning said volatile material into the distillation column at substantially the point of original withdrawal, withdrawing from the uppermost of said zones all of the steam present together with the vaporous xylene, condensing the material from the uppermost zone, separating the xylene as liquid from the condensate, and returning a portion of this liquid xylene to the uppermost of said zones as reflux, in sufficient amounts to avoid condensation of steam in said column.

4. In a process for separating the components of a combined mixture comprising (a) the synthesis reaction products and (b) the catalytic decomposition reaction products of a 1,1-diarylethane, said mixture containing as major constituents undecomposed diarylethane, a compound selected from the group consisting of mono- and di-alkyl-substituted benzene, and a compound selected from the group consisting of mono- and di-alkyl nuclear-substituted styrene the steps which comprise combining (a) and (b), deriving sufficient heat and steam from the reaction products of (b) to vaporize and act as diluent for said combined mixture and separating the mixture in a fractional distillation column by passing the vaporized mixture upwardly through the zones of said column; withdrawing the undecomposed diarylethane as liquid from a lower zone, treating said liquid to volatilize material having a lower boiling point, recovering the diarylethane and returning said volatile material into the distillation column at substantially the point of original withdrawal, continuing the distillation, introducing a sulfur polymerization inhibitor into the liquid, and withdrawing the said styrene compound as liquid from an intermediate zone of said column, treating said liquid to volatilize material having a lower boiling point, recovering the said styrene compound and returning said volatile material into the distillation column at substantially the point of original withdrawal, withdrawing from the uppermost of said zones all of the steam present together with the vaporous aforementioned substituted benzene, condensing the material from the uppermost zone, separating the substituted benzene compound as liquid from the condensate, and returning a portion of this aralkyl liquid to the uppermost of said zones as reflux, in sufficient amounts to avoid condensation of steam in said column.

5. The process of claim 4 wherein the diarylethane is 1,1-ditolylethane, the substituted benzene is toluene, and the styrene compound is methylstyrene.

No references cited.